Nov. 30, 1965   G. W. BROWN ETAL   3,220,908
CONTAINER ASSEMBLY MACHINE
Filed Aug. 1, 1962   5 Sheets-Sheet 1

INVENTORS
GAYLORD W. BROWN
DONALD J. RISE
BY
ATTORNEYS

INVENTORS
GAYLORD W. BROWN
DONALD J. RISE
BY
ATTORNEYS

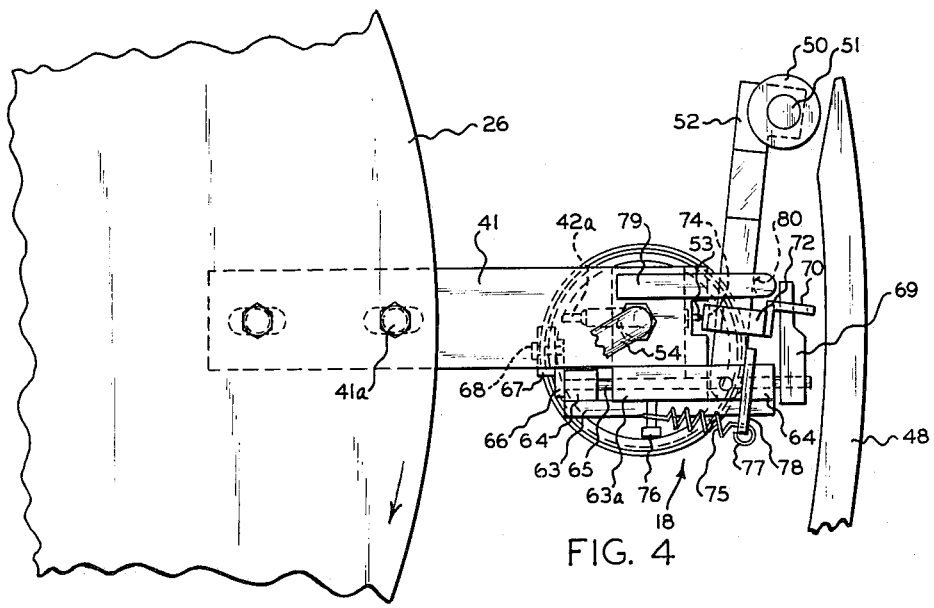
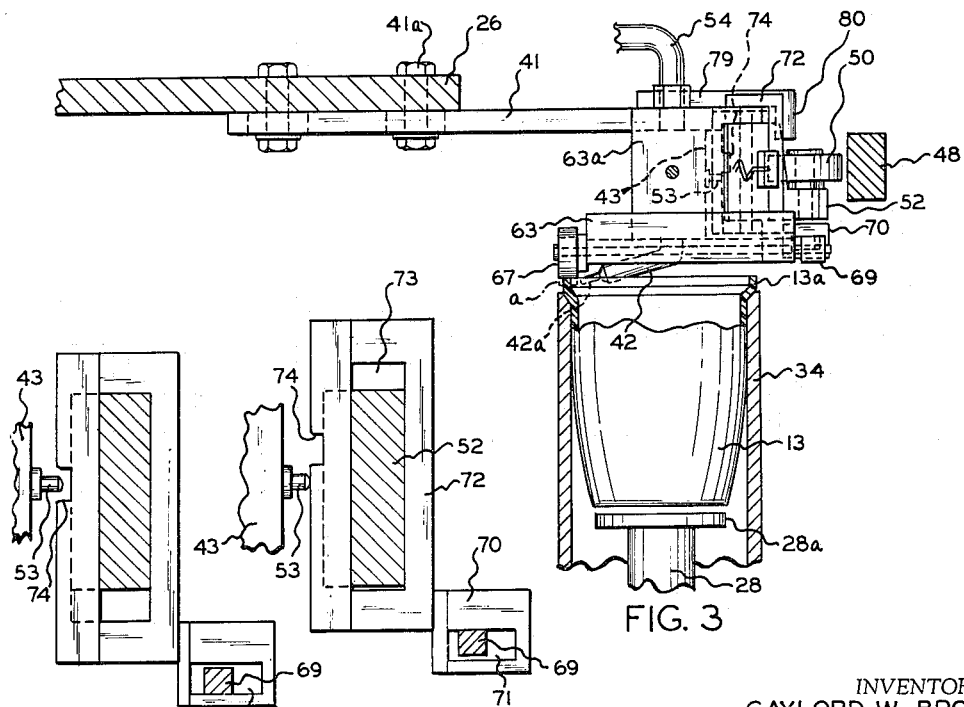
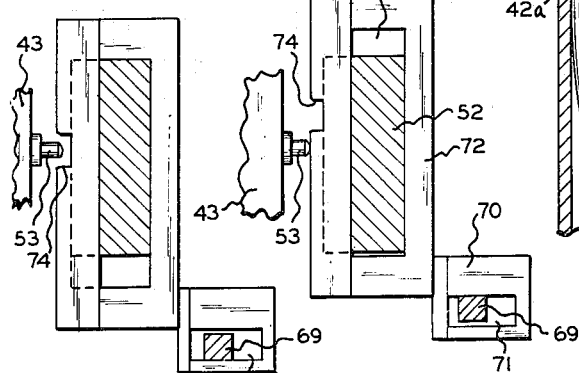

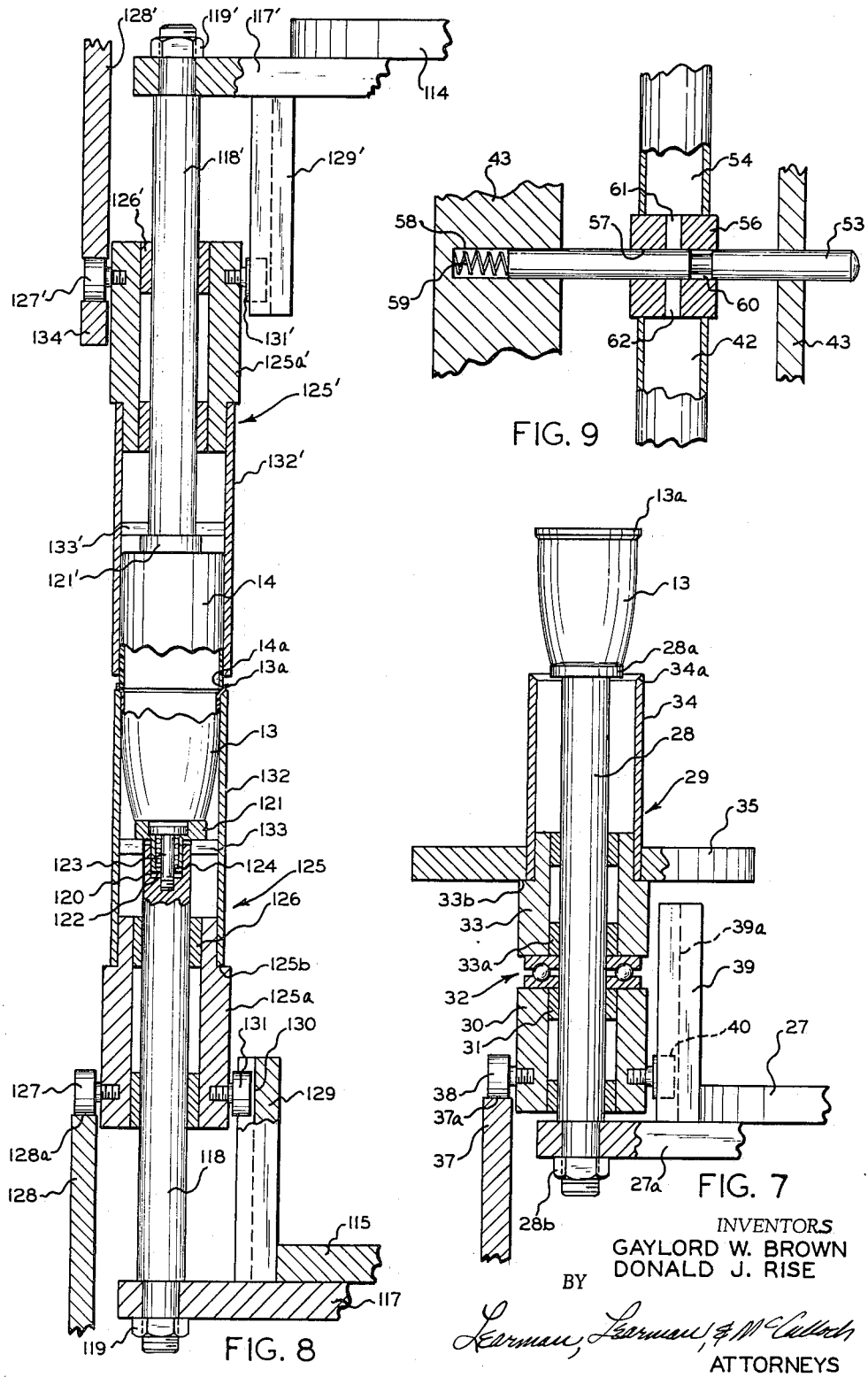

United States Patent Office 3,220,908
Patented Nov. 30, 1965

3,220,908
CONTAINER ASSEMBLY MACHINE
Gaylord W. Brown and Donald J. Rise, Beaverton, Mich., assignors to Brown Machine Company of Michigan, Inc., a corporation of Michigan
Filed Aug. 1, 1962, Ser. No. 214,122
27 Claims. (Cl. 156—357)

This invention relates to apparatus for assembling and joining together the sectionally formed parts of containers made of organic plastics.

Plastic containers are today replacing metal and glass containers in many industries for many reasons. Generally, the plastic containers can be less expensively fabricated, do not dent or shatter, and are corrosion resistant and thus adaptable to handling a wide variety of products. While closable one-piece containers have been blow-molded, it is expensive to mass produce them in this manner because of the cost of the equipment required and the relatively slow rate at which they can be produced.

The present invention is predicated upon the different concept of more economically preforming separate container sections as by differential pressure forming of heated sheet stock, and is concerned with methods and machines for assembling and sealing together the sections in a rapid and continuous manner in keeping with the overall objective of minimizing the container costs in mass production.

One of the prime objects of the invention is to provide continuous processing machinery of the character indicated, in which the upper portions or shells of the containers to be formed move to a station at which the container bottom sections or shells are supplied and at which the bottom sections are joined to the upper shells.

Another object of the invention is to provide mechanism of the character described wherein means is provided for sealing together the shell sections when they are so brought together.

Still a further object of the invention is to provide continuously traveling guides for receiving the two parts of the container and accurately vertically positioning them so that they may be joined together with the precision required in an economic and reliable manner.

Still a further object of the invention is to provide a machine of this type that will operate continuously over long periods of time without the need of interruption for adjustment or repair, and will assemble the containers in a container manufacturing line at a rate that is sufficiently rapid that other operations in the manufacturing line, such as the filling of the containers with the product, and the application of the caps to the containers, need not be slowed.

Another object of the invention applying to one embodiment thereof is to provide a machine of the type mentioned in which mechanisms are provided for applying adhesive to the interior surfaces of the lips on the container shells which are to receive the edges of the other portions or shells of the containers.

A further object of the invention is to provide such a machine including carrier mounted, adhesive applying nozzle mechanisms mounted over rotatable, container part carrying members which are readily revolved by a relatively simple and reliable device of inexpensive design which utilizes the orbital rotation of the part carrying members themselves to revolve the members so that the nozzle mechanisms can apply a uniform adhesive coating over the circumferences of the lips provided on the container parts.

Other objects and advantages of the invention will be pointed out specifically or will become apparent from the following description when it is considered in conjunction with the appended claims and the accompanying drawings, in which:

FIGURE 3 is a partly sectional, fragmentary, enlarged, elevational view rotated 180° clockwisely and showing the carrier mounted mechanism for applying an adhesive coating to the interior face of the lip of one the container portion;

FIGURE 4 is a top plan view thereof;

FIGURE 5 is a vertical, sectional view taken on an enlarged scale with parts of the adhesive applying mechanism in a position in which the presence of a container portion to which the glue is to be applied is sensed;

FIGURE 6 is a similar view on an enlarged scale with the adhesive applying mechanism inoperative as when no container portion has been received and the adhesive applying nozzle mechanism is not to be operated;

FIGURE 7 is a sectional, elevational view on an enlarged scale illustrating the pedestal for receiving the container portion to which the adhesive coating is to be applied and associated mechanism;

FIGURE 8 is a similar sectional, elevational view on an enlarged scale illustrating the mechanism for receiving and aligning the two container portions, the container portions being shown in joined or assembled position;

FIGURE 9 is a fragmentary, vertical, sectional view on an enlarged scale illustrating a typical valve device which could be employed to furnish adhesive to the adhesive applying nozzle when actuated by cam operated members;

Figure 1:
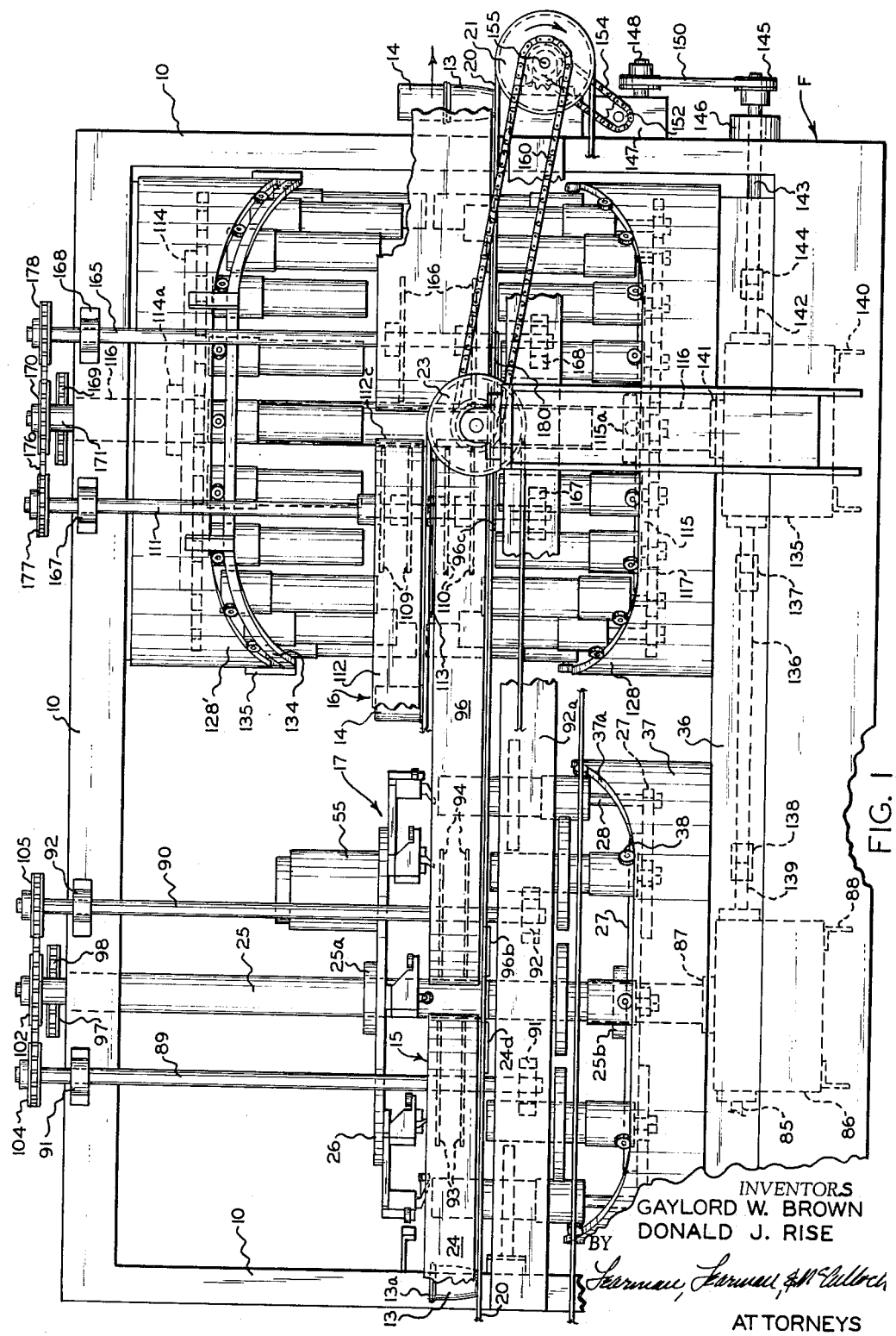
FIGURE 1 is a front elevational view of the assembly machine with separate parts illustrated on the incoming portions of the conveyors and the assembled container leaving on the discharge portion of one of the conveyors at the right end of the view.
Figure 2:
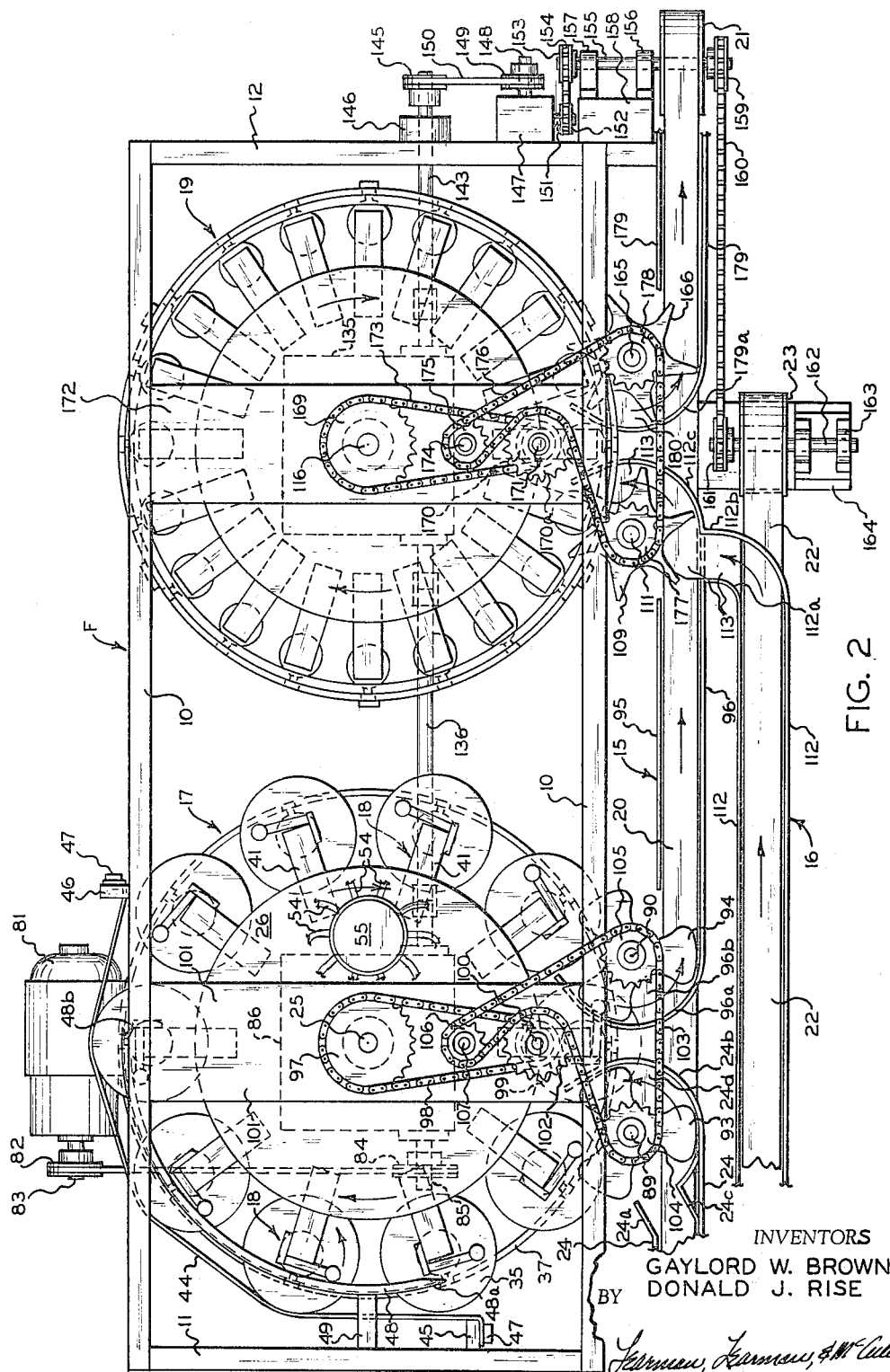
FIGURE 2 is a top plan view thereof with the container parts omitted in the interests of clarity.
Figure 10:
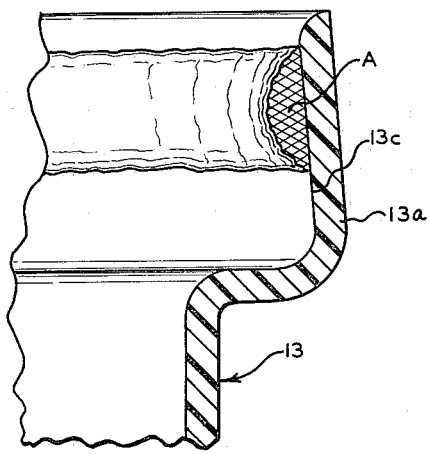
FIGURE 10 is a greatly enlarged, fragmentary, sectional view showing the adhesive bead applied to the one part of the container.
Figure 11:
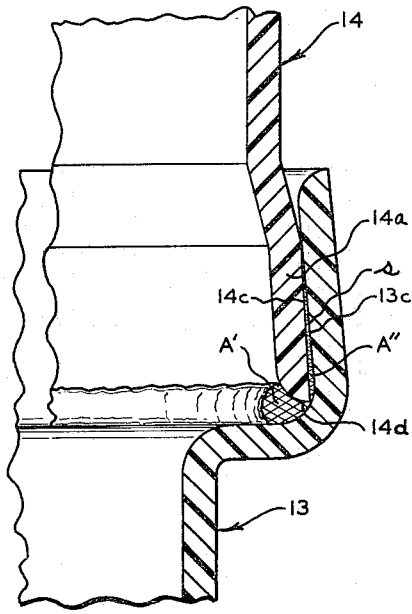
FIGURE 11 is a similar view showing the two container parts in assembled relation.

Referring now more particularly to the accompanying drawings, in which a preferred embodiment of the invention only has been shown, a letter F generally indicates the frame of the machine, which may be suitably fabricated of conventional support members which in the present instance include side frames 10 connected by front and rear end frames 11 and 12, respectively (FIGURES 1 and 2). As shown in FIGURES 8, 10 and 11, the parts 13 and 14 to be joined together comprise an upper shell portion and a bottom portion, respectively, which, when united in the manner shown in FIGURES 8 and 11, provide a container in inverted position in FIGURE 8 which can then be capped after it is turned over and filled with a suitable product. It will be seen that the shell 13 includes an outwardly belled lip portion 13a, and the bottom 14, which is closed at one end, includes a slightly belled edge 14a which is received by the lip portion 13a. The interior wall 13c preferably inclines slightly vertically (i.e., 5°) and the exterior wall 14c also is inclined vertically, but preferably at a lesser angle (i.e., 3°) so that an adhesive retention space $s$ is provided between them as shown in FIGURE 11.

In FIGURES 1 and 2 endless conveyors are shown at 15 and at 16 for conveying the parts 13 and 14, respectively, continuously to and through the machine. As shown in FIGURE 1, the shells 13, with the lips 13a disposed upwardly, are supplied first of all to a rotary carrier assembly generally designated 17 which mounts overhead adhesive or glue applying assemblies generally designated 18 which are operative to apply a uniform, but relatively thin, liquid adhesive coating to the interior wall of the lips 13a. From the carrier 17 the shells 13 proceed on conveyor 15 to a second carrier assembly generally designated 19 where the shell portions 14 are joined to them, the carrier 19 thence transferring the assembled containers 13 and 14 to the right end portion of conveyor 15 for delivery to a machine for inverting and delivering product to the containers.

The conveyor 15 comprises an endless belt 20 trained around a front pulley 21 and a rear pulley (not shown) and the conveyor 16 comprises an endless belt 22 trained around a front pulley 23 and a rear pulley (not shown). Side guides 24, including an angularly disposed portion 24a on one side guide and a curvilinear portion 24b on the other side guide, are provided for the conveyor belt 20 as shown and are supported from the frame side plates 10 in any suitable manner, the guide portion 24b having a part supporting floor portion 24d for a purpose which will presently be apparent.

*The adhesive applying assemblies and associated carrier*

The carrier assembly, generally deignated 17, comprises a rotary shaft 25 mounting an upper disk 26 and a lower disk 27 for movement with the shaft 25 through a relatively slow path of revolution, the disks or plates 26 and 27 being supported by collars 25a and 25b on shaft 25. Mounted on the lower disk 27 (see FIGURE 7) are radially extending plates 27a through which extend pedestals or posts 28 having head portions 28a which, it will be noted, are at least of the diameter of the outer circumference of the reduced diameter end of shell or part 13. Each pedestal post 28, which is anchored as with a nut 28b, is surrounded by a vertically traveling guide tube assembly generally designated 29 which includes a lower sleeve 30 mounting slide bearings 31 which receives the pedestal 28. Supported on sleeve 30 is a ball thrust bearing 32 mounting an upper sleeve 33 having slide bearings 33a for similarly receiving the pedestal 28, sleeve 33 being shouldered as at 33b to receive a shell-raising tube 34 and an actuator disk 35 which fixes to the members 33 and 34. As shown in FIGURES 3 and 7, the tube 34 is of a diameter to receive the part 13, except for the lip 13a, and the upper edge of the tube 34 is beveled as at 34a to conform to the shape of the lip so that tube 34 will be capable of raising the part 13 off the pedestal head 28a as shown in FIGURE 3.

Fixed by the frame F in any acceptable manner, as by being welded to support rails 36 thereon, is a stationary cylindrical cam member 37 on which follower rollers 38 mounted by the guide tube assemblies 29 and more particularly the sleeves 30 travel, the upper surface 37a of the member 37 providing a circular cam track which is appropriately configured to raise and lower each sleeve assembly 29 as desired. It will be seen that each sleeve assembly 29 is supported for vertically aligned travel by a vertical track or guide 39 having a vertically extending track way 39a which receives follower roller 40 mounted on the sleeve 30 opposite the follower roller 38.

Preferably adjustably mounted above each guide tube assembly 29 on a bar 41 secured by bolts or the like 41a to the upper disk 26 is an adhesive applying assembly generally designated 18. Each of these assemblies 18 includes a nozzle member 42 which extends initially substantially axially relative to a pedestal 28 and the part 13 supported thereby from a valve 43, as shown in FIGURE 3, and thence is bent outwardly and downwardly so that its tip 42a is disposed radially adjacent the more vertical terminal portion of the lip 13a.

At a time when liquid adhesive is being expressed from a nozzle tip 42a in a fine stream, the part 13 receiving it is being slowly rotated so that a uniform and even coating is applied around the entire circumference of the lip 13a. This is accomplished with a vertically disposed, flexible belt member 44 (see FIGURE 2) which is anchored to the end plate 11 and side wall 10 by brackets 45 and 46, respectively, through the medium of suitable bolts 47 or the like, the orbital movement of disks 35 causing rotation of the disks 35 and tubes 34 when the disks 35 engage the stationary belt 44.

During the time the tubes 34 are being revolved, a stationary cam track 48 fixed by members such as brackets 49 extending from end wall 11 and side plate 10 actuates the adhesive applying assemblies 18 to apply a suitable adhesive to the parts 13. It will be seen that the curvilinear cam track 48 includes inclined terminal ends 48a and 48b which permit the follower rollers 50 (see FIGURES 3 and 4), which are rotatably mounted by pins 51 on the control arms 52 for actuating the adhesive applying assemblies 18, to operate smoothly. The valve 43 may be the Model C–60 valve manufactured by the John P. Fox Company of Monrovia, California, which is operated when a spring-returned, reciprocal button 53 is depressed. Each of the valves 43 is supplied with adhesive under pressure through a flexible hose 54 leading into its upper end and conveying adhesive from a tank 55 (FIGURES 1 and 2) mounted by the upper disk or plate 26 of the carrier. Air under pressure provided in the upper end of tank 55 in the conventional manner pressurizes the adhesive. In FIGURE 9 we have shown a workable valve wherein the line 54 leads to a member 56 having a bore 57 for slideably receiving the pin 53 which also is received in a chamber 58 provided in the one wall of the valve 43 as shown, spring 59 being provided in the chamber 58 to tend to urge the pin 53 to outward position. The pin 53 includes an annular groove 60 which normally is displaced from a port 61 extending from line 54 through the member 56 and a port 62 extending through the member 56 to the nozzle line 42. Plainly, when the plunger 53 is depressed the groove 60 is aligned with the ports 61 and 62 and adhesive under pressure is permitted to issue from the nozzle tip 42a.

Occasionally, there is a gap in the line of parts or shells 13 being supplied to carrier assembly 17 and a pedestal 28 will appear opposite the cam track 48 without a part 13. In this instance, the overhead adhesive applying mechanism remains inoperative and no fluid is issued from the nozzle 42, although the tube 34 is revolved when the disk 35 engages the belt 44. Depending from the bracket 41 is a plate 63a mounting a member 63 having bearings 64 at each end for pivotally supporting a shaft 65 on which a crank arm 66 is fixed, arm 66 pivotally mounting a roller 67 on a pin 68 to project over the tube 34 and the lip 13a of the part 13 (see FIGURE 3). In normal position, gravity positions the roller 67 in substantially the broken line position a in which it is shown in FIGURE 3 and it is only when the part 13 is raised upwardly by the tube 34 that the roller 67 is moved upwardly. When this occurs, the shaft 65 is pivoted to raise an arm 69 mounted fast to the opposite end of the shaft 65 which has an end received in a ring member 70 having a laterally elongated opening 71, as shown in FIGURE 5. Mounted on the ring member 70 is a member 72 having a vertically elongated opening 73 which passes the control arm 52. The member 72 also includes a notch 74 opposite the actuator push pin 53 of the valve 54. When a part 13 is supported by a tube 34 and has raised the roller 67, the member 72 has been raised by the arm 69 to dispose the notch 74 above the depressable pin 53 as in FIGURE 5, and accordingly when control arm 52, which is pivotally supported on the member 63 as at 75, is swung inwardly the member 72 is likewise moved inwardly and control pin 53 is depressed. However, if no part 13 is in position to receive the adhesive, the arm 69 remains down and the notch 74 remains in axial alignment with the pin 53 as in FIGURE 6. Accordingly, when the control arm 52 is swung inwardly the pin 53 is simply received by the notch 74 and is not depressed. Mounted on the support plate 63a is a post 76 fixing a spring 77 also connected to a bar 78 mounted by the control arm 52 which normally tends to urge the control arm 52 outwardly. A member 79 mounted on top of bar 41 includes an overhainging dependent stop pin 80 which positively limits outward movement of the control arm 52.

Provided to drive the shaft 25 and, in fact, all of the driven elements of the machine is a motor 81 (FIGURE 2) mounting a drive sheave 82 on its armature shaft 83 which connects to a sheave or pulley 84 on the input shaft 85 of a speed reducer 86. Shaft 25 is coupled to the output shaft of the reducer as at 87 in any suitable manner and it will be seen that the reducer 86 can readily be supported on cross bars 88 connecting the side frames 10 in any suitable manner.

Mounted at the one side of the carrier assembly 17 adjacent the conveyor 15 are a pair of vertically disposed shafts 89 and 90 which are supported by upper and lower sets of bearings 91 and 92, respectively, the lower bearings 91 and 92 being mounted on a side rail 92a. Each of the shafts 89 and 90 mounts star wheels which are identified at 93 and 94, respectively, and it will readily be seen that star wheels 93 which, as shown in FIGURE 2, travel in a counterclockwise direction, transfer parts 13 from the conveyor 15 and floor 24d to the pedestal surfaces 28a, and the star wheels 94, which similarly travel in a counterclockwise direction in FIGURE 2, return them from the carrier and pedestal surfaces 28a across floor part 96b to the conveyor 15. At the input side, guide 24 mounts a diverter portion 24c and guides 95 and 96 are provided adjacent output star wheels 94, the guide 96 having a curvilinear portion 96a to guide the parts 13 as the star wheels 94 transfer them to the conveyor belt 20.

Provided on the shaft 25 to permit it to drive both shafts 89 and 90 is a sprocket 97 around which is trained a chain 98 (see FIGURE 2) which is also trained around a sprocket 99 mounted on a vertical stub shaft 100 extending from a top plate 101. A drive chain 103 for driving shafts 89 and 90 is trained around sprocket 102 and sprockets 104 and 105 mounted on the shafts 89 and 90, respectively. In addition, an idler sprocket 106 is provided mounted on a stub shaft 107 which is supported by the plate 101 which extends between the side plates 10 of the frame.

*The part assembling carrier and associated mechanism*

As shown in FIGURES 1 and 2, the conveyors 16 and 15 lead to vertically spaced pairs of star wheels 109 and 110, respectively, mounted on a shaft 111. To aid in conveying the bottoms or parts 14 in inverted position on the conveyor 16, guide rails 112 are provided as shown (see FIGURE 2 particularly) which include a floor portion 113 extending from the belt 22 at the level thereof, the guide rails 112 including curved portions 112a and 112b to transfer the parts 14 to the star wheels 109, and the one guide 112 having an additional curvilinear portion 112c which cooperates with the star wheels 109 to transfer the parts 14. The carrier 19 similarly includes an upper disk or plate 114 and a lower disk or plate 115 (see FIGURE 8) supported from collars 114a and 115a on a central shaft 116 as shown for revolution with the shaft 116.

Mounted by the lower suport plate 115 are radially extending support bars 117 for pedestal posts 118 which can be secured in position by nuts 119 as shown. The upper end of each pedestal 118 is provided with a recess 120 slideably receiving a cap member 121 which includes a lower flange 122, as shown in FIGURE 8. Provided to mount the cap 121 in position is a socket-headed cap screw 123 or the like, and a coil spring 124 under compression serves to exert a force tending at all times to urge the cap 121 inwardly or downwardly. A lower guide tube assembly generally designated 125 surrounds each pedestal 18 and comprises a sleeve 125a having slide bearings 126 at each end for receiving the pedestal shaft 118, a follower roller 127 being mounted by the sleeve 125a to ride on the cam surface 128a of a stationary, circular cam 128 which is fixed to the frame F radially outwardly of the post 118 in any acceptable manner. A stabilizer or guide 129 having a trackway 130 to receive a follower roller 131 mounted opposite the follower roller 127 is also provided fixed to the support plate 115 in each instance to stabilize the vertical travel of the sleeve 125a. It will be seen that each sleeve 125a is shouldered as at 125b to receive a guide tube 132 which includes ribs or shoulders 133 for raising the cap 121 to move the shell 13 upwardly at the time that the parts 13 and 14 are to be joined together.

The upper plate 114 supports identical members in inverted position which, for the sake of convenience, have been identified by the same numerals except that the numerals have been primed to distinguish the upper parts from the lower parts. No further description of the upper parts is, therefore, necessary. In the case of the upper guide tube assemblies 125', a lower cam track 134 is provided on which the rollers 127' ride and straps 135 (see FIGURE 1) may be employed to support the circular tracks 134 from the stationary cam track 128'. The construction of the upper end of the pedestal 118' and the cap 121' is identical with the construction previously described for the pedestal 118 and cap 121, and a spring under compression urges the cap 121' inwardly at all times. When the ribs 133' fixed to the interior of each tube 132' engage the adjacent cap 121', the cap 121' is forced outwardly or downwardly at the same time that cap 121 below is forced outwardly or upwardly by ribs 133.

The shaft 116 and asociated parts are driven from a speed reducer 135 through a shaft 136 which is coupled thereto as at 137 and coupled as at 138 to another output shaft 139 extending from the speed reducer 86. The reducer 135 is similarly supported on angle braces 140 joining the side walls 10 of the frame and includes an output shaft 141 which is coupled to the shaft 116. Another output shaft 142 is coupled to a shaft 143 as at 144 and drives a pulley 145 which is mounted on the end of shaft 143, a bearing 146 being provided on the end wall 12 to support the shaft 143. The pulley 145, through the medium of a gear box 147, drives the pulley 21, the gear box 147 having an input shaft 148 mounting a pulley 149 which receives the belt 150 which is also trained around pulley 145. The output shaft 151 of gear box 147 mounts a sprocket 152 for driving a sprocket 153 through a chain 154, sprocket 153 being mounted on the shaft 155 which supports pulley 21. The shaft 155 is supported by bearings 156 and 157 mounted on a support plate 158 secured to the frame F. Mounted on the outer end of shaft 155 to drive the pulley 23 of conveyor 16 is a sprocket 159 for a chain 160 which is also trained around a sprocket 161 fixed on the shaft 162 which supports the pulley 23, bearings 163 being provided on a support plate 164 attached to frame F to support the shaft 162.

Provided opposite the star wheel shaft 111 is a star wheel shaft 165 mounting a pair of discharge star wheels 166, as shown in FIGURE 1. Shafts 111 and 165 are supported by pairs of bearings 167 and 168, respectively, mounted on the one frame side wall 10 and rail 92a. To drive the shafts 111 and 165, a sprocket 169 is mounted on the reduced upper end of shaft 116 and drives a sprocket 170 mounted on a stub shaft 171 on a cross plate member 172 which spans the side walls 10, the sprockets 169 and 170 being connected by drive chain 173. Also mounted by the plate 172 is a stub shaft 174 which mounts an idler sprocket 175, and a chain 176 is trained around the sprockets 170a and 175 and also around the drive sprockets 177 and 178 which are mounted on the star wheel shafts 111 and 165, respectively.

The extending right end (see FIGURE 2) of conveyor 15 provides a discharge pathway for the joined parts 13 and 14 and it will be seen that side guide plates 179 are provided, the outer guide plate 179 having a curvilinear portion 179a which cooperates with the star wheels 166 to deliver the assembled containers to the front end of belt 20. A stationary floor portion 180 is provided at the level of belt 120 to support the containers as the star wheels 166 transfer them.

The operation

In operation the container portions or shells 13 initially pass from the conveyor belt 20 across floor portion 24c to the star wheels 93 which transfer them to the pedestal caps 28a. In this position the shells 13 are moved orbitally with the pedestals 28 in a clockwise direction in FIGURE 2, the tubes 34 almost immediately rising to enclose the parts 13 and prevent them from being displaced. As the cam track 37 continues to move each tube 34 upwardly, the tube's upper edge 34a engages the lip 13a of a shell 13 and raises it off a pedestal surface 28a, as shown in FIGURE 3, to a position in which the overhead nozzle tip 42a is opposite the lip portion 13a. At this time, the roller 67 is lifted and part 72 is correspondingly lifted (see FIGURE 5) so that the notch 74 is disposed above the depressible pin 53. When the control arm 52 then engages the cam 48 and is swung inwardly, the part 72 is moved to depress pin 53 and an adhesive liquid stream is released by the nozzles 42a to apply an adhesive bead A (FIGURE 10) to the interior face of lip 13a. At this time also the disk 35 is revolved through its contact with belt 44 and the part 13 is slowly revolved by the tube 34 which is lifted off the pedestal portion 28a to permit the rotation to take place. Just before the shell portion 13 has completed one revolution, the control arm reaches the terminal end 48b of the cam 48 and the supply of adhesive is cut off, with spring 75 restoring the control arm 52 and the spring returned pin 53 returning to its original position.

The output star wheels 94 deliver the adhesive bearing shells 13 to the belt 20 once again and transport them to the star wheels 110 which move them across floor portion 96c at the level of belt 20 to the pedestal caps 121 which receive them at that level. Simultaneously, the star wheels 109 transfer the parts 14 in the inverted position in which one is shown in FIGURE 1 proceeding to the carrier assembly 19 across the floor 113 at the level of belt 22 and as the shells 14 follow the counterclockwise path the upper tubes 132' move down over them at about the time they become axially aligned with the tubes 132' and hold them in vertically aligned position with the pedestals 121, the tubes 132 at the same time moving upwardly to prevent displacement of the shells 13. The result is that the container portions 14 drop into position within the lips 13a and, as the parts progress clockwisely on carrier assembly 19, the tubes 132 and 132' continue to advance toward one another until finally the ribs 133 and 133' raise the pedestal caps 121 and lower the pedestal caps 121' slightly to press the portions 13 and 14 together and effect a tight sealing juncture. The bead of adhesive A (FIGURE 10) is pushed downwardly by the curved edge 14d and the major portion is displaced as at A' in FIGURE 11 to seal the edge 14a, the remainder filling the space s as at A". The parts 13 and 14 are held in this position as the carrier assembly 19 revolves and until the adhesive has set. However, as the joined parts 13 and 14 approach the discharge star wheels 166 the tubes 132 lower and the tubes 132' raise so that finally the star wheels 166 are free to transfer the assembled containers to the front end of conveyor 15. Because the upper parts 13 of the containers formed are presented to the nozzles 42 and pedestals 28 in inverted position, the adhesive cannot leak down and deface the exterior walls of either parts 13 or 14.

The container shells or sections 13 and 14 may be joined together by other means than an adhesive by the guide and assembly tubes 132 and 132' and pedestals 118 and 118' shown in FIGURE 8. For instance, ultrasonic energy sealing means which would provide a tight seal, even through some kind of sealing agent, might be employed in conjunction with the tubes 132 and 132' or high frequency radiation devices or thermal impulse devices might be used which are capable of forming a clean and extremely strong seal with many plastics. To provide an exceptionally strong physical bond, a crimp sealing method may be used in conjunction with the assembly tubes 132 and 132'.

Figure 12:
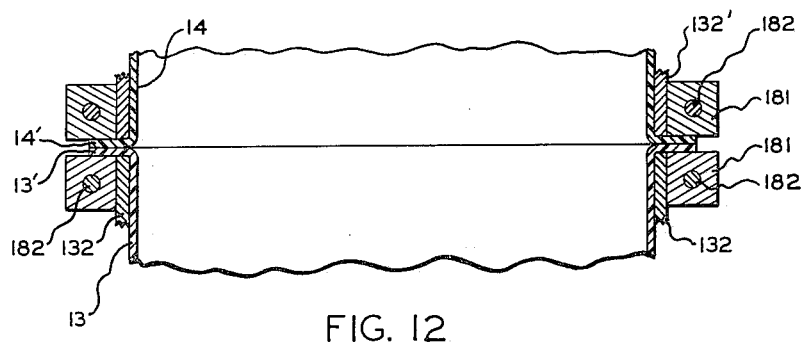
FIGURE 12 is an enlarged, sectional, elevational view illustrating a modified embodiment of the invention.

In FIGURE 12 we have shown relatively simple heat sealing means mounted on the tubes 132 and 132' to illustrate how various sealing mechanisms can be used. The shell portions 13 and 14 are provided with laterally directed flanges 13' and 14' and the tubes 132 and 132' mount rings 181 which incorporate resistance wire heating elements 182, as shown in FIGURE 12. The carrier 17 is eliminated from the apparatus and the shells 13 and 14 proceed directly to the carrier apparatus 19 in the manner indicated. The cams 128 and 128' are so configured that the tubes 132 and 132' are pressed together midway in the travel of the shells 13 and 14 on the carrier 19 and after the conventional heating rings 181 have had an opportunity to render the lips or flanges 13' and 14' soft and plastic in character. When the tubes 132 and 132' are separated in the same manner as previously, later during the rotation on carrier apparatus 19, the flanges 13' and 14' are securely heat sealed.

This type of heat sealing is well suited to various plastics. Whereas the high impact polystyrene and polyethylene shells 13 and 14 have been glued together in the manner described, they can also be readily heat sealed by the elements 181. The rings 181 are preferably of an electrically insulating, heat conducting material and such heat sealing units are readily available in the market place.

It should be apparent that we have perfected an assembly machine capable of operation at relatively high speeds in an efficient and reliable manner. It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. Apparatus for assembling container upper and lower shells comprising; carrier means including individual carriers for moving certain of said shells in a path of travel; adhesive applying means mounted by each carrier for travel therewith; said adhesive applying means including nozzle means arranged to overlie the carrier; means actuatable to operate said nozzle means to release adhesive therefrom to the adjacent edge of a shell on the carrier; means preventing said latter means from operating said nozzle means if a shell is not in position on the carrier below; and means for moving other shells into sealing engagement with the adhesive bearing edges of certain shells.

2. The combination defined in claim 1 in which said individual carriers include elements mounted for rotation about their axes while moving in said path of travel; and drive means is provided for rotating said carriers.

3. The combination defined in claim 1 in which said carrier means travels in a rotary path; stationary cam means is provided adjacent said path; and control arm means are mounted by said adhesive applying means to be moved by said cam means to actuate said means operating the nozzle means.

4. The combination defined in claim 1 in which said carriers include rotatably mounted elements which ride on a stationary cam track below, the elements being raised up to receive said adhesive applying means and lowered therefrom when the adhesive has been applied.

5. Apparatus for assembling upper and lower plastic container shells including carrier means; first conveyor means for moving first container shells to said carrier means; second conveyor means for moving second container shells to said carrier means; lower guide and support assembly means on said carrier means receiving said first container shells from said first conveyor means; upper guide assembly means on said carrier means vertically aligned with said lower guide and support assembly means receiving said second container shells from said second conveyor means and vertically aligning them with said first container shells; and means for relatively vertically moving said upper and lower assembly means to firmly engage and seal said first and second container shells.

6. A machine as set forth in claim 5 wherein said lower guide and support assemblies each comprise initial support means surrounded by positioning sleeve means and said positioning sleeve means is movable vertically relative to said initial support means and includes a cam follower traveling on a stationary cam means for raising said positioning sleeve means around a first shell and lowering it therefrom once the assembly has been effected.

7. A machine as set forth in claim 6 wherein said upper guide and support assemblies comprise upper positioning tube means with a cam follower traveling on an upper stationary cam for lowering a tube means around a second shell and raising it therefrom once the assembly has been effected.

8. A machine as set forth in claim 6 wherein an initial support means comprises a pedestal member having a spring depressed cap thereon raisable by a sleeve to effect a sealing juncture of the shells.

9. Apparatus as claimed in claim 5 wherein means is provided for applying an adhesive to one edge of certain of said shells, being either all the first or all the second container shells.

10. Apparatus as claimed in claim 5 wherein said means for applying an adhesive is inoperative save when a shell is adjacent said means.

11. Apparatus as defined in claim 5 in which means is incorporated for welding said first and second container shells together upon movement of said upper and lower assembly means relatively vertically to engage said first and second container shells.

12. Apparatus as defined in claim 5 in which said means for relatively vertically moving said upper and lower assembly means moves the adjacent edges of said first and second container shells into firmly engaged telescopic relation.

13. Apparatus for assembling upper and lower plastics container shells, including rotating carrier means, first conveyor means for moving first container shells to said carrier means at one level; second conveyor means for moving second container shells to said carrier means at a higher level, a plurality of individual lower guide and support assembly means circumferentially spaced on said carrier means and each receiving one of said first container shells from said first conveyor means; a plurality of individual upper guide assembly means on said carrier means, each vertically aligned with one of said lower guide and support assembly means and receiving one of said second container shells from said second conveyor means and vertically aligning it with one of said first container shells; and means for relatively vertically moving said upper and lower assembly means toward one another at a predetermined time in the rotation of said carrier means and for welding the adjacent edges of said first and second container shells together.

14. Apparatus as claimed in claim 13 wherein said lower guide and support assemblies each comprise initial support means surrounded by positioning sleeve means and said positioning sleeve means is movable vertically relative to said initial support means and includes a cam follower travelling on a stationary cam means for raising said positioning sleeve means around a first shell and lowering it therefrom once the assembly has been effected.

15. Apparatus as claimed in claim 13 wherein said upper guide and support assemblies comprise upper positioning tube means with a cam follower travelling on an upper stationary cam for lowering a sleeve means around a second shell and raising it therefrom once the assembly has been effected.

16. Apparatus for assembling upper and lower container shells comprising; conveying means for carrying first container shells in vertical position; adhesive material applying means associated therewith for applying an adhesive to the free edges of the first shells; carrier means; lower guide and support assemblies thereon receiving said first container shells; second conveying means for conveying second container shells; and upper guide and support assemblies also thereon and vertically aligned with said lower guide and support assemblies receiving said second container shells from said second conveying means and vertically aligning them with said first shells to permit said second shells to be joined to said first shells; said lower guide and support assemblies each comprising initial support means surrounded by positioning tube means and said positioning tube means being movable vertically relative to said support means and including a cam follower traveling on a stationary cam means for raising said positioning tube means around a first shell and lowering it therefrom once the assembly has been effected.

17. Apparatus for assembling upper and lower container shells comprising; conveyor means for carrying first container shells in vertical position; adhesive material applying means associated therewith for applying an adhesive to the free edges of the first shells, carrier means; lower guide and support assemblies thereon receiving said first container shells; second conveying means for conveying second container shells; upper guide and support assemblies also thereon and vertically aligner with said lower guide and support assemblies receiving said second container shells from said second conveying means and vertically aligning them with said first shells to permit said second shells to be joined to said first shells; said upper guide and support assemblies comprising upper positioning tube means with a cam follower traveling on an upper stationary cam means for lowering a tube means around a second shell and raising it therefrom once the assembly has been effected.

18. Apparatus for assembling upper and lower container shells comprising; conveying means for carrying first container shells in vertical position; adhesive material applying means associated therewith for applying an adhesive to the free edges of the first shells; carrier means; lower guide and support assemblies thereon receiving said first container shells; second conveying means for conveying second container shells; upper guide and support assemblies also thereon and vertically aligned with said lower guide and support assemblies receiving said second container shells from said second conveying means and vertically aligning them with said first shells to permit said second shells to be joined to said first shells; and upper and lower star wheel means timed to operate with said carrier means and transfer the second and first shells simultaneously to said vertically aligned upper and lower guide and support assemblies.

19. In apparatus for assembling container parts; first conveying means including support members for moving first container parts continuously in a path of travel; normally inoperative adhesive applying means carried by the said first conveying means for applying an adhesive to one edge of each of said first parts; trip means for said adhesive applying means for rendering operative said adhesive applying means; means for moving said support members and adhesive applying means relatively a predetermined distance so that parts carried on said support members actuate said trip means; and second conveying means for conveying other parts into sealing engagement with the adhesive bearing edges of said first parts.

20. Apparatus for assembling container upper and lower shells comprising; rotary carrier means including individual, pedestal and positioning tube assemblies for moving certain of said shells having receiving lips thereon in an orbital path of travel; adhesive applying means for applying an adhesive to said lips mounted by said carrier means over each assembly for travel therewith; each adhesive applying means including an adhesive supply tube for delivering adhesive under pressure and a nozzle leading therefrom arranged over each assembly; valve means for each adhesive applying means, normally blocking flow from its supply tube to its nozzle, displaceable to communicate its tube and nozzle; an actuator for each adhesive applying means normally positioned so that movement from a removed location toward its valve means does not displace said valve means; trip means for each actuator and valve means operable when engaged by a shell on the assembly below to move its actuator to a position in which said movement from said one location toward its valve means displaces its valve means; control arm means for each adhesive applying means for moving its actuator from said one location; stationary cam means engaged by each control arm means during the rotary travel of said carrier means; and means for moving other shells into end-to-end engagement with the adhesive bearing edges of said certain shells.

21. The combination defined in claim 20 in which said pedestal and positioning tube assemblies each comprise a support pedestal fixed on said carrier and a surrounding tube slidably supported on said pedestal for vertical travel thereon to raise a shell on said pedestal upwardly to a position opposite the nozzle to dispose the lip on said shell to receive the adhesive.

22. The combination defined in claim 21 in which each said tube mounts a follower roller and a stationary circular cam is provided on which said rollers ride.

23. The combination defined in claim 21 in which said trip means comprises a member, dependent from each adhesive applying means generally over each tube, which is pivotally mounted to be swung generally upwardly when engaged by a shell.

24. The combination defined in claim 20 in which said actuator comprises a member having a wall with a recess normally opposite said valve means which is moved above said valve means when said actuator is moved upwardly by said trip means.

25. The combination defined in claim 20 in which said means for moving other shells into end-to-end engagement with the adhesive bearing edges of said certian shells comprise lower and upper axially aligned positioning tubes for accommodating said certain shells and other shells respectively, and pedestal members within said tubes mounting said tubes for vertical movement thereon; the pedestal members having spring depressed caps thereon raisable by said tubes to effect a sealing juncture of the shells within said upper and lower tubes; there being means for controlling vertical movement of said upper and lower tubes.

26. Apparatus for assembling container upper and lower shells comprising; carrier means for moving certain of said shells in a path of travel; support assemblies for said shells on said carrier means; adhesive applying means mounted by said carrier means to overlie each assembly for travel therewith; each adhesive applying means including adhesive supply tube means for delivering adhesive under pressure and a nozzle leading therefrom arranged over each assembly; valve means for each adhesive applying means normally blocking flow from its supply tube means to its nozzle displaceable to communicate said tube means and nozzle; and cam controlled means for displacing the valve means of the adhesive applying means and expressing adhesive through their nozzle to the edges of said certain shells during the path of movement of said carrier means.

27. Apparatus for assembling first and second container shells comprising; carrier means; first conveyor means for moving first container shells to said carrier means; first guide and support assembly means on said carrier means receiving said first shells; second conveyor means for moving second container shells to said carrier means; second guide assembly means on said carrier means substantially axially aligned with said first guide and support assembly means receiving said second container shells from said second conveyor means and substantially axially aligning them with said first shells; means for relatively axially moving said first and second assembly means to engage the adjacent edges of said first and second container shells, and means for welding the adjacent edges of said first and second container shells together.

References Cited by the Examiner

UNITED STATES PATENTS

| | | | |
|---|---|---|---|
| 1,378,508 | 5/1921 | Woodward | 220—4 |
| 1,384,035 | 7/1921 | Alexander | 220—4 |
| 2,099,055 | 11/1937 | Ferngren | 229—3.5 |
| 2,788,834 | 4/1957 | Slaughter | 156—69 |
| 2,920,989 | 1/1960 | Cochran et al. | 156—556 |
| 2,963,394 | 12/1960 | Wilkinson | 156—304 |
| 3,053,726 | 9/1962 | Larson et al. | 156—304 |
| 3,064,715 | 11/1962 | Bland | 156—556 |

EARL M. BERGERT, *Primary Examiner.*

HAROLD ANSHER, *Examiner.*